United States Patent Office 3,394,117
Patented July 23, 1968

3,394,117
POLYMERIZATION CATALYST
John W. Bayer, Perrysburg, and Edgardo Santiago, Toledo, Ohio, assignors to Owens-Illinois Inc., a corporation of Ohio
No Drawing. Filed May 27, 1963, Ser. No. 283,575
7 Claims. (Cl. 260—93.7)

The present invention relates to a catalyst and method for polymerization of olefins. In particular, this invention relates to a polymerization catalyst which comprises a heavy metal halide and a silane in which the silicon atom is bonded to four hydrocarbon radicals, and to the method of polymerization with this catalyst.

The addition of triethylaluminum to a heptane solution of titanium tetrachloride causes formation of a brown-black precipitate which consists mainly of reduced titanium chlorides; the precipitate and supernate catalyze the low pressure polymerization of many alpha-olefins. This important discovery by Karl Ziegler was reported in Belgian Patent 533,362 (1954), which disclosed catalysts prepared by interaction of a trialkylaluminum with a compound of a metal from Group IV–B, V–B, or VI–B of the Periodic Table, including thorium and uranium. The basic Ziegler method was subsequently expanded by many workers, particularly Natta et al., to include preparation of highly linear and often stereoregular polymers of high molecular weight from a wide variety of alpha-olefins. Application of these processes to mono-substituted ethylenes provides polymers which possess tertiary asymmetric carbon atoms. If these asymmetric centers have the same steric configuration, at least for long portions of the chain, the polymer is said to be isotactic; if the asymmetric carbon atoms alternate in configuration, the polymer is syndiotactic; and if the asymmetric arrangement is random, the polymer is atactic. The terms Ziegler catalyst and Ziegler process are applied generically to compositions and procedures which broadly resemble those discovered by Ziegler. The reported variations of the basic concepts are too diverse to be susceptible of concise summary, but the majority of important Ziegler catalysts are encompassed in the definition of a catalyst system which contains (a) a compound, usually a halide or ester, of a transition metal from Group IV, V, or VI of the Periodic Chart, and (b) a compound of the formula $RMX_y$, where R represents an aryl or alkyl radical, M represents a metal atom from Group I, II, or III, X represents a halogen atom or an alkoxy radical, and $y$ represents an integer less than the oxidation state of M. We have now discovered that a component of type (b) can be replaced by a tetrasubstituted silane to give systems which still possess the ability to polymerize olefins.

It is therefore an object of the present invention to provide a new olefin polymerization catalyst.

It is another object of this invention to provide a catalyst system of the Ziegler type in which the usual metal alkyl is replaced by a tetrasubstituted organosilane.

It is a further object of this invention to provide a method for polymerization of olefins by means of a new and novel catalyst system.

These and other objects and advantages of the present invention will be apparent from the following disclosure and claims.

According to the present invention there is provided a catalyst system which comprises: (A) a compound selected from the group which consists of $VCl_3$ and $TiX_n$, where X represents a halogen atom with atomic number greater than 16, and $n$ is 2, 3, or 4, and (B) a compound of the formula

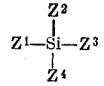

where $Z^1$ represents a radical selected from the group which consists of alkyl radicals with less than three carbon atoms and alkenyl radicals with less than seven carbon atoms; $Z^2$ represents a radical selected from the group which consists of alkyl radicals with less than three carbon atoms, alkenyl radicals with less than seven carbon atoms, and aryl radicals with less than ten carbon atoms; $Z^3$ represents a radical selected from the group which consists of alkyl radicals with less than three carbon atoms, alkenyl radicals with less than seven carbon atoms, and aryl radicals with less than ten carbon atoms; and $Z^4$ represents a radical selected from the group which consists of alkyl radicals with less than three carbon atoms, alkenyl radicals with less than seven carbon atoms, aryl radicals with less than ten carbon atoms, and aralkyl radicals with less than ten carbon atoms. A further aspect of this invention provides a method for polymerization which comprises contacting an olefin with a catalyst system of the type just described.

Examples of compounds of the formula $TiX_n$ as defined above are titanium dichloride, titanium trichloride, titanium tetrachloride, titanium tribromide, titanium tetrabromide, titanium triiodide, and titanium tetraiodide.

Alkyl radicals with less than three carbon atoms referred to above are the methyl and ethyl radicals. Alkenyl radicals with less than seven carbon atoms referred to above include vinyl, allyl, propenyl, isobutenyl, 3-butenyl, 4-pentenyl, and 5-hexenyl radicals. Aryl radicals with less than ten carbon atoms referred to above indicate radicals which contain only carbon and hydrogen atoms, for example, the phenyl, 2-methylphenyl, 3-methylphenyl, 4-methylphenyl, 2,4-dimethylphenyl, and 2,4,6-trimethylphenyl radicals. Aralkyl radicals with less than ten carbon atoms referred to above indicate radicals which contain only carbon and hydrogen atoms, for example, benzyl, 1-phenylethyl, 2-phenylethyl, 2-methylbenzyl, 4-methylbenzyl, and 2,4-dimethylbenzyl radicals. The tetrasubstituted silanes of the present invention, hereafter designated generically as $R_4Si$, therefore include tetramethylsilane, tetraethylsilane, vinyltrimethylsilane, divinyldimethylsilane, divinyldiethylsilane, trivinylmethylsilane, tetravinylsilane, allyltriethylsilane, diallyldimethylsilane, vinylallylmethylethylsilane, triallylethylsilane, tetraallylsilane, di(3-butenyl)dimethylsilane, 4-pentenyltrimethylsilane, tri(5-hexenyl)methylsilane, benzyltrimethylsilane, dibenzyldiethylsilane, diphenyldimethylsilane, triphenylethylsilane, di(2,4-dimethylphenyl)dimethylsilane, di(2,4-dimethylbenzyl)divinylsilane, and (2,4,6-trimethylphenyl)triallylsilane.

In a usual embodiment of this invention there is provided a catalyst system which comprises: (A) a compound of the formula $TiX_n$ as previously defined, and (B) a compound of the formula

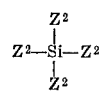

where each $Z^2$ independently has the meaning already assigned. A further usual aspect provides a method for polymerization which comprises contacting an alpha-olefin with a catalyst system of the type just described in a hydrocarbon medium.

In a preferred embodiment of the present invention, there is provided a catalyst system which comprises: (A)

a compound of the formula TiX$_n$ as previously defined, and (B) a compound of the formula $$Z^1-\underset{\underset{Z^1}{|}}{\overset{\overset{Z^1}{|}}{Si}}-Z^1$$

where each $Z^1$ independently has the meaning already assigned. A further preferred aspect provides a method for polymerization which comprises contacting an alpha-olefin with a catalyst system of the type just described in a hydrocarbon medium.

In a particularly preferred embodiment of this invention, there is provided a catalyst system which comprises: (A) a compound of the formula TiX$_n$ as previously defined, and (B) a compound of the formula $$(CH_2=CHCH_2)_aSi(CH_3)_b$$

where $a$ and $b$ are integers excluding zero. A further particularly preferred aspect provides a method for polymerization which comprises contacting ethylene or propylene with a catalyst system of the type just described in heptane at a temperature above room temperature and below the boiling point of the reaction mixture at atmospheric pressure.

It is also within the purview of this invention to add a Lewis acid, particularly aluminum chloride, to the polymerization medium to increase the effectiveness of the catalyst system, and to provide two or more olefinic monomers in order to obtain copolymers.

Materials which are polymerized in accordance with the present invention are, broadly, organic monomers which contain an ethylenic linkage. The method of this invention is especially useful when applied to olefins which contain at least one terminal double bond. The olefinic hydrocarbons most preferred are 1-monoolefins which contain from two to ten carbon atoms per molecule. In particular, ethylene can be rapidly polymerized to a tough, solid polymer upon being contacted with a catalyst of this invention at mild temperatures and low pressures; the resultant products generally have high melting points and high densities. Examples of other suitable olefins are propylene, 1-butene, 1-pentene, 1-hexene, 1-heptene, 1-octene, and 1-decene. Examples of branched chain olefins are 3-methyl-1-pentene, 3-methyl-1-butene, 4-methyl-1-pentene, and 4,4-dimethyl-1-pentene. Examples of di- and polyolefins include 1,3-butadiene, isoprene, 2,3-dimethylbutadiene, 2-phenyl-1,3-butadiene, 1,5-hexadiene, 1,4-pentadiene, 1,4,7-octatriene, 2-methyl-1,3-butadiene, 2-methyl-1,3-pentadiene, 2,3-dimethyl-1,3-pentadiene, 2-methyl-3-ethyl-1,3-pentadiene, and 1,4,6-trimethyl-1,5-hexadiene. Other olefinic compounds useful in the present include styrene, alphamethylstyrene, vinylcyclohexane, cyclopentadiene, allylbenzene, and allylcyclohexane. Examples of non-hydrocarbon monomers include chloroprene, 2-methoxybutadiene, methyl acrylate, methyl methacrylate, vinyl chloride, vinyl acetate, 2-methyl-5-vinylpyridine, 4-vinylpyridine, and 2-vinylpyridine.

The mechanism of Ziegler polymerization is not known. The Aufbau reaction, i.e., chain extension, which occurs when a trialkylaluminum is treated with ethylene at high temperature and pressure.

$$R_3Al + nCH_2=CH_2 = R_2Al(CH_2CH_2)_nR$$

and the polymerization of diazomethane with a trialkylboron catalyst $$R_3B + nCH_2N_2 = R_2B(CH_2)_nR + nN_2$$

can be regarded as prototypes. Ziegler has shown that the Aufbau reaction does not proceed when the trialkylaluminums are in their usual dimeric condition in hydrocarbon solution $$2R_3Al = R_2Al\overset{R}{\underset{R}{\diagup\diagdown}}AlR_2 = R_2Al^+R_4Al^-$$

and he attributes this lack of reactivity to the decreased electrophilicity of the aluminum atom in the dimer. Since many workers propose that the Ziegler catalyst is a stable complex between the heavy metal halide and the trialkylaluminum, it has been maintained, by analogy with the cited limitations of the Aufbau reaction, that the aluminum atom in such a complex is not the site of chain growth. However, the transition metal atom, because of its unfilled d-orbitals, is electrophilic, and is usually regarded as the point of attachment for the growing polymer chain. Despite these arguments, Natta believes that an electron-deficient complex forms between the trialkylaluminum and the transition metal halide, and that subsequent chain growth occurs at the aluminum atom in the complex—see Natta, et al., Tetrahedron, 8, 86 (1960). These and many other proposed mechanisms are incorporated in the comprehensive mechanism suggested by Cossee, Trans. Faraday Soc., 58, 1226 (1962). This formulation also explains the observation that stereoregularity of product is evidently dependent on heterogeneity of system; no homogeneous Ziegler system has given stereoregular products. Cossee assumes that polymerization occurs at one titanium ion in the surface layer of a titanium trichloride lattice, of which one surface chlorine atom is replaced by an alkyl group, R, while an adjacent vacant chlorine site accommodates the incoming monomer molecule.

$$R_3Al + TiCl_4 = R_2AlCl + RTiCl_3$$

$$RTiCl_3 = R\cdot + TiCl_3$$

$$TiCl_3 + RTiCl_3 = RTiCl_2 + TiCl_4$$

$$RT_2Cl_2 + R'CH=CH_2 = R-\underset{\underset{R'}{|}}{CH}-CH_2-TiCl_2$$

$$R-\underset{\underset{R'}{|}}{CH}-CH_2-TiCl_2 + R'CH=CH_2 =$$

$$R-\underset{\underset{R'}{|}}{CH}-CH_2-\underset{\underset{R'}{|}}{CH}-CH_2-TiCl_2 \text{ etc}$$

The trialkylaluminum is, by this mechanism, regarded as necessary for initiation, but not for propagation. This is supported by the recent observation that alkyltitanium halides can themselves act as olefin polymerization catalysts, Karapinka, et al., J. Polymer Sci., 50, 143 (1961). Further verification arises from the observation that olefins which contain polar groups, e.g., vinyl chloride, acrylonitrile, and acrylic esters, are in general not susceptible of polymerization by Ziegler catalysts: the unshared electron pairs of the monomers evidently occupy the empty d-orbitals which must be available to the olefinic linkage if polymerization is to occur. If the Cossee proposal is accepted for the catalyst of the present invention, the initial reaction for a system which contains titanium tetrachloride can be expressed as $$R_4Si + TiCl_4 = R_3SiCl + RTiCl_3$$

followed by the subsequent equations shown above; the extension of this explanation to other heavy metal halides is obvious. It is not intended to limit the present invention to its interpretation by this tentative mechanism. It is of interest, however, that the participation of the R$_4$Si compounds in the reaction indicated is unique among Ziegler systems in that the silicon compound is neither a Lewis acid nor otherwise strongly electrophilic, as are other known Ziegler organometallic constituents.

In the experiments which correspond to the following specific examples, normally liquid silanes were commericial materials which were distilled to give a fraction boiling over a temperature range of not more than 3° C. This fraction was then stored under nitrogen in containers equipped with rubber stoppers to allow insertion of a hypodermic needle so that the silanes could be transferred to the reaction mixture by means of a hypodermic syringe.

The titanium trichloride was an anhydrous, purple, crystalline material sealed in 0.2-gram quantities in individual ampules in a nitrogen atmosphere, and was obtained from the Anderson Chemical Division of the Stauffer Chemical Company. The titanium trichloride in the following examples was introduced into the reaction vessel by means which excluded contact with air. The heptane was carefully purified and dried before use and was transfered to the reaction vessel in a nitrogen atmosphere. High purity ethylene was also employed, and was carefully further purified immediately before use.

The reaction vessel was in each case a 1-liter round bottom flask equipped with a side arm and a thermowell containing a thermocouple attached to an automatic temperature recorder; the flask was mounted in a heating mantle controlled by a variable transformer. The reaction vessel was shaken by means of a mechanical shaker applied throughout the reaction time. Gaseous monomers were continuously introduced into the reaction vessel so as to maintain pressures in most cases in the range from 20 to 25 p.s.i.g., as indicated in the examples.

The samples of polymer prepared by the methods of the following examples were, after the workup procedure described, dried at 60–70° C. under reduced pressure, and then compression molded into films at 240° C. under a pressure of about 10,000 p.s.i. A small portion of a three-mil film thus prepared was placed between glass plates on a Fischer-Johns melting point apparatus, and a melting range was determined as the temperature at which clearing of the polymer began and the temperature at which further clearing ceased. The remainder of the three-mil film was submitted for infrared analysis. A ten-mil film similarly prepared was subjected to a modification of the ASTM 762–60T procedure for determination of density. None of the samples was annealed unless otherwise specified in the particular example. Densities reported were at 23° C. It should be noted that polyethylene densities are usually lower for unannealed samples. However, apparently where very high molecular weight polymers are used, annealing does not result in further preferred orientation, and density is not appreciably affected. The solid polymers produced by the method of this invention are useful for making articles such as bottles, bowls, pails, etc. Liquid soft polymers can be used as rubber plasticizers, plasticizers for organic plastics, as caulking compounds, etc.

The following examples of the invention are illustrative, and are not to be taken as limiting the invention. Where annealed densities are reported in these examples, they were determined on samples annealed in steam for one hour at 121° C., and cooled to room temperature at a rate of about 14° C. per hour.

Example 1.—Tetramethylsilane

A. In the reaction vessel of the apparatus previously described were placed 300 ml. of purified heptane, 0.2 grams of titanium trichloride, and 1.3 grams of tetramethylsilane. The mixture thus obtained was heated under a nitrogen atmosphere with shaking to 57° C., whereupon the nitrogen blanket was replaced by propylene maintained at a pressure of 20 p.s.i.g. The mixture was heated with agitation at about 66° C. for about four hours, and then allowed to cool to about room temperature. To the resultant mixture was added 500 ml. of a 4:3 mixture of isopropyl alcohol and methanol, the polymer was removed by filtration, suspended in 100 ml. of 4:1 isopropyl alcohol: water, and again separated by filtration. By repetition of this procedure the polymer was washed a second time with isopropyl alcohol-water and then with acetone, and then dried in a vacuum oven at about 60° to 70° C. under a slightly subatmospheric pressure.

B. The procedure of Example 1A was repeated, except that butadiene under a pressure of 20 p.s.i.g. was substituted for propylene and a reaction time of three hours was used.

C. The procedure of Example 1A was repeated, except that ethylene under a pressure of 20 p.s.i.g. was substituted for propylene, 0.25 grams of aluminum chloride was added to the initial reaction mixture: the reaction time was three hours. The product polymer had an infrared spectrum substantially identical with that commonly obtained for high density polyethyylene.

Example 2.—Tetraethylsilane

In the reaction vessel of the apparatus previously described were placed 300 ml. of purified heptane, 0.2 gram of titanium trichloride, and 1.5 ml. of tetraethylsilane. The mixture thus obtained was heated under a nitrogen atmosphere with shaking to 57° C., whereupon the nitrogen blanket was replaced by butadiene maintained at a pressure of 20 p.s.i.g. The mixture was heated with agitation at about 93° C. for about three hours, and then allowed to cool to room temperature. To the resultant mixture was added 500 ml. of a 4:3 mixture of isopropyl alcohol and methanol, the polymer was removed by filtration, suspended in 100 ml. of 4:1 isopropyl alcohol: water, and again separated by filtration. This procedure was repeated, and the polymer was then dried in a vacuum oven at about 62–70° C.

Example 3.—Vinyltrimethylsilane

A. A catalyst system which consisted of 0.2 gram of titanium trichloride and 1.5 ml. of vinyltrimethylsilane in 300 ml. of heptane under a nitrogen atmosphere was prepared by the procedure of Example 1A, and the nitrogen was then replaced by butadiene at a pressure of 20 p.s.i.g. The reaction mixture thus obtained was shaken at 93° C. for three hours, and the product polymer was subjected to the workup procedure previously described.

B. A catalyst system which consisted of 0.2 gram of titanium trichloride, 0.25 gram of aluminum chloride, and 1.9 ml. of vinyltrimethylsilane in 300 ml. of heptane under a nitrogen atmosphere was prepared by the procedure of Example 1A, and the nitrogen was then replaced by ethylene at a pressure of 20 p.s.i.g. The reaction mixture thus obtained was shaken at 93° C. for three hours, and the product polymer was subjected to the workup procedure previously described. The infrared spectrum of the sample thus obtained was super-imposable with that for high density polyethylene. The melting point of the product was 124° C.

Example 4.—Divinyldimethylsilane

A. By the procedure of Example 1A, a catalyst composition was prepared from 0.4 gram of titanium trichloride, 0.95 gram of aluminum chloride, and 1.0 ml. of divinyldimethylsilane, and the mixture thus obtained was treated with ethylene under a pressure of 20 p.s.i.g. at 93° C. for five hours. After the workup procedure already scribed, the product polymer had a melting point cf 210° C.

B. By the procedure of Example 1A, a catalyst composition was prepared from 0.2 gram of titanium trichloride, 0.25 gram of aluminum chloride, and 2.0 ml. of divinyldimethylsilane, and the mixture thus obtained was treated with ethylene under a pressure of 20 p.s.i.g. at 93° C. for three hours. After the workup procedure already described, the product polymer had a melting point of 131° C.

C. In the apparatus described in Example 1A were placed 0.25 gram of vanadium trichloride, 0.25 gram of aluminum chloride, 2.3 ml. of divinyldimethylsilane, and 300 ml. of heptane, and the resultant mixture was treated with ethylene at 20 p.s.i.g. and a temperature of 93° C. for three hours. The product polymer, after the workup already described, had a melting point of 128° C.

Example 5.—Tetravinylsilane

A. A catalyst system which consisted of 0.4 gram of titanium trichloride and 0.5 ml. of tetravinylsilane in 300 ml. of heptane under a nitrogen atmosphere was prepared by the procedure of Example 1A, and the nitrogen was then replaced by ethylene at a pressure of 20 p.s.i.g. The reaction mixture thus obtained was shaken at 93° C. overnight, and the product polymer was subjected to the workup procedure previously described. The infrared spectrum of the sample thus obtained was superimposable with that for high density polyethylene.

B. A catalyst system which consisted of 0.2 gram of titanium trichloride and 1.5 ml. of tetravinylsilane in 300 ml. of heptane under a nitrogen atmosphere was prepared by the procedure of Example 1A, and the nitrogen was then replaced by butadiene at a pressure of 20 p.s.i.g. The reaction mixture thus obtained was shaken at 93° C. for three hours, and the product polymer was subjected to the workup procedure previously described.

C. By the procedure of Example 1A, 0.25 gram of vanadium trichloride and 0.25 gram of aluminum chloride were treated with 2.5 ml. of tetravinylsilane in 300 ml. of heptane. The reaction mixture thus obtained was subsequently treated with ethylene at a pressure of 20 p.s.i.g. for three hours at 93° C. A small amount of polyethylene was obtained.

Example 6.—Allyltrimethylsilane

In each of the experiments summarized in Table I below, the preparation of the titanium trichloride-allyltrimethylsilane catalyst system and its subsequent treatments with ethylene were carried out as described in Example 1A; the workup procedure was also the same.

of titanium trichloride, 1.8 grams of aluminum chloride, and 1.5 ml. of allyltrimethylsilane at a polymerization temperature of 50° C. overnight, gave a substantially increased yield. The resultant product had a melting point of 135–140° C. and a density of 0.939 gram per cubic centimeter.

K. A catalyst system was prepared from 0.2 gram of titanium trichloride, 0.75 ml. of triethylsilane, and 0.77 ml. of allyltrimethylsilane by the procedure of Example 1A, and subsequently treated with ethylene at a pressure of 20 p.s.i.g. and a temperature of 50° C. for two hours as therein described. The produce was subsequently purified by the usual procedure; the melting point was 150° C., and the density was 0.940 gram per cubic centimeter.

L. A catalyst system which consisted of 0.25 gram of vanadium trichloride, 0.25 gram of aluminum chloride, and 1.5 ml. of allyltrimethylsilane was prepared by the procedure of Example 1A, and subsequently contacted with ethylene at a pressure of 20 p.s.i.g. and a temperature of 93° C. for three hours. The resultant product had a melting point of 120° C.

Example 7.—Diallyldimethylsilane

A. In the reaction vessel of the apparatus previously described were placed 300 ml. of purified heptane, 0.2 gram of titanium trichloride, and 0.24 ml. of diallyldimethylsilane. The mixture thus obtained was heated under a nitrogen atmosphere with shaking to 57° C., whereupon the nitrogen blanket was replaced by ethylene maintained at a pressure of 20 p.s.i.g. The mixture was TABLE I.—POLYMERIZATION OF ETHYLENE WITH TITANIUM TRICHLORIDE-ALLYLTRIMETHYLSILANE

| Experiment Number | Trichloride, gram | Allyltrimethylsilane, ml. | Temp., ° C. | Time, hrs. | Product | |
|---|---|---|---|---|---|---|
| | | | | | Melting Point, ° C. | Density, g./cc. |
| 6A | 0.2 | 0.12 | 93 | 3 | 135 | 0.941 |
| 6B | 0.2 | 1.2 | 93 | 3 | 215 | 0.925 |
| 6C | 0.2 | 1.5 | 93 | 3 | | |
| 6D | 0.2 | 5.0 | 93 | 3 | | |
| 6E | 0.4 | 1.5 | 50 | 12 | 124–128 | 0.933 |
| 6F | 0.4 | 1.5 | 93 | 12 | 123–128 | 0.925 |
| 6G | 0.6 | 3.6 | 93 | 6 | | |

H. In the apparatus described in Example 1A were placed 0.4 gram of titanium trichloride, 1.5 ml. of allyltrimethylsilane, and 300 ml. of heptane, and the resultant mixture was treated with propylene at a pressure of 20 p.s.i.g. for about 12 hours at 54° C. The product polymer, after the workup already described, had a melting point of 117–122° C., and a density of 0.896 gram per cubic centimeter.

I. A catalyst system which consisted of 0.2 gram of titanium tribromide and 1.5 ml. of allyltrimethylsilane in 300 ml. of heptane under a nitrogen atmosphere was prepared by the procedure of Example 1A, and the nitrogen was then replaced by ethylene at a pressure of 20 p.s.i.g. The reaction mixture thus obtained was shaken at 93° C. for three hours, whereupon a small amount of product was obtained. In a second run, 0.4 gram of titanium tribromide and 1.5 ml. of allyltrimethylsilane in 300 ml. of heptane were used as the catalyst system, and polymerization was allowed to proceed overnight at 54° C.; a larger amount of polymer was obtained.

J. By the procedure of Example 1A, 0.2 gram of titanium trichloride and 0.25 gram of aluminum chloride were treated with 1.2 ml. of allyltrimethylsilane in 300 ml. of heptane. The reaction mixture thus obtained was subsequently treated with ethylene at a pressure of 20 p.s.i.g. for three hours at 93° C. The product polymer had a melting point of 126° C. and a density of 0.932 gram per cubic centimeter. In a second run, 0.4 gram of titanium trichloride, 2.9 grams of aluminum chloride, and 1.5 ml. of allyltrimethylsilane were used, and the time was increased to four hours. The product polymer had a melting point of 117–122° C. A third run which used 0.4 gram heated with agitation at 93° C. for three hours, and then allowed to cool to room temperature. To the resultant mixture was added 500 ml. of a 4:3 mixture of isopropyl alcohol and methanol, the polymer was removed by filtration, suspended in 100 ml. of 4:1 isopropyl alcohol: water, and again separated by filtration. By repetition of this procedure, the polymer was washed a second time with isopropyl alcohol-water, and then dried in a vacuum oven at about 70° C. under a slightly sub-atmospheric pressure. The polymer thus obtained had a melting point of 218° C. and a density of 0.929 gram per cubic centimeter. The procedure just described was repeated, using a catalyst system composed of 0.2 gram of titanium trichloride and 2.4 ml. of diallyldimethylsilane. The product had a melting point of 135° C.

B. The procedure of Example 1A was repeated, using a catalyst system comprised of 0.2 gram of titanium trichloride and 1.5 ml. of diallyldimethylsilane, and a second run was made using 0.4 gram of titanium trichloride, 1.5 ml. of diallyldimethylsilane, and a temperature of 56° C. overnight. The product polymer had a melting point of 155° C. and a density of 0.896 gram per cubic centimeter.

C. By the procedure of Example 1A, a catalyst system was prepared from 0.2 gram of titanium trichloride and 1.5 ml. of diallyldimethylsilane, and subsequently contacted with butadiene at a pressure of 20 p.s.i.g. and a temperature of 93° C. for three hours. A small amount of polymer was obtained.

D. A catalyst system was prepared according to the procedure of Example 1A, using 0.2 gram of titanium trichloride, 0.25 gram of aluminum chloride, and 2.4 ml.

of diallyldimethylsilane. The mixture thus obtained was treated with ethylene at 20 p.s.i.g. and 93° C. for three hours to give a polymer which had a melting point of 127° C. and a density of 0.891 gram per cubic centimeter.

E. By the procedure of Example 1A, a catalyst system prepared from 0.2 gram of titanium chloride, 0.25 gram of aluminum chloride, and 1.5 ml. of diallyldimethylsilane was treated with propylene at a pressure of 20 p.s.i.g. and a temperature of 93° C. for three hours. A second run was made using 0.4 gram of titanium trichloride, 0.45 gram of aluminum chloride, and 1.5 ml. of diallyldimethylsilane, whereupon a higher yield of polymer was obtained. The sample thus obtained had a melting point of 175° C. and a density of 0.850 gram per cubic centimeter.

F. By the procedure of Example 1A, a catalyst system prepared from 0.2 gram of titanium trichloride, 0.25 gram of aluminum chloride, and 2.4 ml. of diallyldimethylsilane was treated with 1-butene at a pressure of 10 p.s.i.g. and a temperature of 93° C. for three hours.

G. A catalyst system was prepared according to the procedure of Example 1A, using 0.25 gram of vanadium trichloride, 0.25 gram of aluminum chloride, and 2.7 ml. of diallyldimethylsilane. The mixture thus obtained was treated with ethylene at a pressure of 20 p.s.i.g. and a temperature of 93° C. for three hours to give a polymer with a melting point of 118° C. A second run was made, using 0.25 gram of vanadium trichloride, 0.25 gram of aluminum chloride, and 2.0 ml. of diallyldimethylsilane.

H. By the procedure of Example 1A, a catalyst system was prepared from 0.25 gram of vanadium trichloride, 0.25 gram of aluminum chloride, and 1.5 ml. of diallyldimethylsilane. The mixture thus obtained was treated with propylene as described in the cited example to give a small amount of polymeric product.

Example 8.—4-pentenyltrimethylsilane

A. According to the procedure of Example 1A, a catalyst system was prepared from 0.2 gram of titanium trichloride and 1.5 ml. of 4-pentenyltrimethylsilane, and subsequently treated with ethylene at a pressure of 20 p.s.i.g. and a temperature of 93° C. for three hours to give a polymeric product.

B. A catalyst system was prepared from 0.2 gram of titanium trichloride and 1.5 ml. of 4-pentenyltrimethylsilane by the procedure of Example 1A, and subsequently treated with propylene as therein described to give a polymeric product.

C. By the procedure of Example 1A, a catalyst system was prepared from 0.2 gram of titanium trichloride, 0.25 gram of aluminum chloride, and 1.5 ml. of 4-pentenyltrimethylsilane. The mixture thus obtained was treated with ethylene at a pressure of 20 p.s.i.g. and a temperature of 93° C. for three hours to give, after the workup procedure therein described, a polymeric product.

D. A catalyst system was prepared as described in Example 1A, using 0.2 gram of titanium trichloride, 0.25 gram of aluminum chloride, and 1.5 ml. of 4-pentenyltrimethylsilane. The mixture thus obtained was treated with propylene at a pressure of 20 p.s.i.g. and a temperature of 93° C. for three hours to give a polymer.

Example 9.—5-hexenyltrimethylsilane

A. By the procedure of Example 1A, a catalyst system was prepared from 0.2 gram of titanium trichloride and 1.5 ml. of 5-hexenyltrimethylsilane in 300 ml. of heptane. The catalyst thus prepared was treated with ethylene at 20 p.s.i.g. for three hours at 93° C. to give a small amount of polymeric product.

B. By the procedure of Example 1A, a catalyst system was prepared from 0.2 gram of titanium trichloride, 0.25 gram of aluminum chloride, and 1.5 ml. of 5-hexenyltrimethylsilane. The resultant catalyst was treated with ethylene at 20 p.s.i.g. and 93° C. for three hours. The yield of the product polymer was substantially increased over that from the procedure of Example 9A.

Example 10.—Benzyltrimethylsilane

A. In the reaction vessel of the apparatus previously described were placed 300 ml. of purified heptane, 0.2 gram of titanium trichloride, and 1.5 ml. of benzyltrimethylsilane. The mixture thus obtained was heated under a nitrogen atmosphere with shaking to 57° C., whereupon the nitrogen blanket was replaced by ethylene maintained at a pressure of 20 p.s.i.g. The resultant mixture was heated with agitation at about 93° C. for three hours, and then allowed to cool to room temperature. To the resultant mixture was added 500 ml. of a 4:3 mixture of isopropyl alcohol and methanol, the polymer was removed by filtration, suspended in 100 ml. of 4:1 isopropyl alcohol-water, and then dried in a vacuum oven at about 60° to 70° C. under a slightly subatmospheric pressure.

B. The procedure of Example 10A was repeated, except that 0.2 gram of titanium tribromide was substituted for the titanium trichloride to give, by the procedure therein described, a polymeric product.

C. The procedure of Example 10A was repeated, except that 0.5 ml. of titanium tetrachloride was substituted for the titanium trichloride to give, by the procedure therein described, a polymeric product.

D. The procedure of Example 10A was repeated, except that 0.5 ml. of titanium tetrachloride was substituted for the titanium trichloride, and propylene was substituted for the ethylene, to give, by the procedure therein described, a polymeric product.

E. The procedure of Example 10A was repeated, except that 0.2 gram of titanium tetraiodide was substituted for the titanium trichloride to give, by the procedure therein described, a polymeric product.

F. The procedure of Example 10A was repeated, except that 0.4 gram of aluminum chloride was added to the catalyst system to give, by the procedure therein described, a polymeric product.

Example 11.—Triphenylmethylsilane

A catalyst system was prepared by the procedure described in Example 1A, using 0.2 gram of titanium trichloride and 1.0 gram of triphenylmethylsilane. The mixture thus obtained was treated with ethylene at a pressure of 20 p.s.i.g. and a temperature of 93° C. for about three hours, and then subjected to the workup procedure previously described. A small amount of polymer was obtained.

Example 12.—Diphenyldivinylsilane

A. By the procedure of Example 1A, a catalyst system was prepared using 0.2 gram of titanium trichloride and 1.5 ml. of diphenyldivinylsilane. The mixture thus obtained was subsequently treated with ethylene at a pressure of 20 p.s.i.g. and a temperature of 93° C. for three hours to give a polymeric product. A second run using 0.2 gram of titanium trichloride and 0.31 gram of diphenyldivinylsilane, and a third run using 0.2 gram of titanium trichloride and 3.1 gram of diphenyldivinylsilane gave similar results.

B. The procedure of Example 1A was repeated, using 0.2 gram of titanium trichloride and 1.5 gram of diphenyldivinylsilane. The catalyst thus prepared was treated with butadiene at a pressure of 20 p.s.i.g. and a temperature of 93° C. for three hours to give a polymeric product.

C. The procedure of Example 1A was repeated, using 0.2 gram of titanium trichloride, 0.25 gram of aluminum chloride, and 1.5 grams of diphenyldivinylsilane. The catalyst system thus obtained was treated with ethylene at a pressure of 20 p.s.i.g. and a temperature of 93° C. for three hours to give, after the workup procedure previously described, a polymeric product. A second run using 0.2 gram of titanium trichloride, 0.25 gram of aluminum chloride, and 3.1 ml. of diphenyldivinylsilane, and a third run using 0.4 gram of titanium trichloride, 1.9 gram of aluminum chloride and 1.5 ml. of diphenyldivinylsilane gave similar results.

D. The procedure of Example 1A was used to prepare a catalyst system from 0.25 gram of vanadium trichloride, 0.25 gram of aluminum chloride, and 3.5 grams of diphenyldivinylsilane. The resultant mixture was treated with ethylene at a pressure of 20 p.s.i.g. and a temperature of 93° C. for three hours, to give, by the procedure previously described, a polymer with a melting point of 113° C.

It will be evident that modifications of this invention can be made without departing from the spirit and scope of this disclosure or the scope of the following claims.

We claim:
1. As a composition of matter, a catalyst which consists of:
   (A) a compound selected from the group which consists of $VCl_3$ and $TiX_n$, where X represents a halogen atom with atomic number greater than 16, and $n$ is 2, 3, or 4, and
   (B) a compound of the formula $(CH_3)_m SiY_{(4-m)}$, where Y represents a radical selected from the group which consists of methyl, vinyl, allyl, and phenyl radicals, and $m$ is 1, 2, or 3.

2. As a composition of mattter, a catalyst which consists of titanium trichloride and vinyltrimethylsilane.

3. As a composition of matter, a catalyst which consists of titanium trichloride and allyltrimethylsilane.

4. As a composition of matter, a catalyst which consists of titanium trichloride and benzyltrimethylsilane.

5. As a composition of matter, a catalyst which consists of titanium trichloride and diphenyldivinylsilane.

6. A method for polymerization which comprises contacting an olefin with a catalyst which consists of:
   (A) a compound selected from the group which consists of $VCl_3$ and $TiX_n$, where X represents a halogen atom with atomic number greater than 16, and $n$ is 2, 3, or 4, and
   (B) a compound of the formula $(CH_3)_m SiY_{(4-m)}$, where Y represents a radical selected from the group which consists of methyl, vinyl, allyl, and phenyl radicals, and $m$ is 1, 2, or 3.

7. A method for polymerization which comprises contacting an alpha-olefin with a catalyst which consists of:
   (A) a compound selected from the group which consists of $VCl_3$ and $TiX_n$, where X represents a halogen atom with atomic number greater than 16, and $n$ is 2, 3, or 4, and
   (B) a compound of the formula $(CH_3)_m SiY_{(4-m)}$, where Y represents a radical selected from the group which consists of methyl, vinyl, allyl, and phenyl radicals, and $m$ is 1, 2, or 3.

References Cited

UNITED STATES PATENTS

| 3,227,702 | 1/1966 | Small | 260—94.9 |
| 3,086,964 | 4/1963 | Joyner | 260—94.9 |

FOREIGN PATENTS

| 889,829 | 2/1962 | Great Britain. |
| 886,085 | 1/1962 | Great Britain. |

JOSEPH L. SCHOFER, *Primary Examiner.*

M. KURTZMAN, *Assistant Examiner.*